United States Patent Office 3,034,983
Patented May 15, 1962

3,034,983
DRILLING AND COMPLETION FLUID
William A. Reddie and Eugene R. Werlein, Houston, Tex., assignors to Magnet Cove Barium Corporation, Houston, Tex.
No Drawing. Filed Nov. 5, 1957, Ser. No. 694,500
21 Claims. (Cl. 252—8.5)

This invention relates to well drilling and completion fluid compositions of the flocculated clay type and to a method for reducing the fluid loss from such fluid compositions.

There has recently been developed an essentially water base drilling and completion fluid which finds particular use in wells having high bottom-hole temperatures. It also finds use in drilling through formations of highly hydratable material such as shale. In such a fluid, substantial hydration of clay solids is inhibited and they are maintained in a flocculated state. This is contrary to the theory of most drilling muds wherein the clay solids are purposely maintained in a dispersed state. In such a flocculated system, the conventional role of clays has been virtually eliminated and the conventional role of a dispersant, such as quebracho-caustic, has been completely eliminated. Thus, a surfactant is used, usually in conjunction with an electrolyte or salt (e.g. calcium sulfate) to maintain the clay solids in a flocculated condition, thereby giving the fluid an increased tolerance toward low-gravity solids. To control the fluid loss and sometimes to control rheological properties, a polyanion, such as sodium carboxymethylcellulose (hereinafter called CMC), is employed. This polyanion can also be used to give the fluid sufficient weight-suspending power that barite can be added to yield high-weight muds. As a further aid in controlling the fluid loss, small amounts of oil, usually less than 10%, are dispersed in the water phase and the emulsion is stabilized with an emulsifier. For a general discussion of this type (flocculated) well fluid, see, for example, The Oil and Gas Journal, September 10, 1956, pp. 104–107.

At this point, it should be pointed out that when "flocculated" clay solids or muds are referred to herein, it is meant that the clays in such muds are converted (or maintained) in the form of aggregates which are large enough not to act as true colloids to impart substantially increased viscosity to the muds. The viscosity-increasing characteristics of the clays are thereby minimized and they act more as inert solids. The surfactant flocculation permits of a higher solids content in the mud systems without undue increase in viscosity and also the surfactant-salt inhibits the dispersion of drilled clays or shales and tends to maintain the drilled solids as comparatively larger, unhydrated particles.

While such a flocculated fluid system has many advantages, such as those referred to above as well as its lack of a tendency to thicken at high temperatures, difficulty is encountered in controlling the fluid loss therefrom. Immediately after mixing and before heating, the fluid does have acceptably low fluid losses of the order of 2–4 ml. but upon heating to a temperature, say in excess of 250° F., the fluid loss rapidly increases to a prohibitive value. It is thought that this is at least in part due to the thermal decomposition of the CMC. To date, the only known manner of controlling the fluid loss has been to continuously add large quantities of the CMC to replace that which has been degraded by the heating. This material is relatively expensive and large quantities are consumed where the bottom-hole temperature is 300° F. or above. Where a calcium salt, such as calcium sulfate or chloride, is used in the system, it has been considered that the heat stable fluid loss reducing agents, such as sodium polyacrylate (sold under the trademark "Cypan"), are incompatible. This conclusion has been based on the theory that the polyacrylate reacts with the calcium salt to form insoluble calcium polyacrylate.

It is accordingly an object of this invention to provide a drilling and completion fluid of the type wherein a surfactant is employed to maintain a clay in a flocculated state and which has heat-stable low fluid-loss characteristics imparted to it through the use of oil and an emulsifier having a unique capacity for fluid loss reduction in such a fluid.

Another object is to provide a method of reducing the fluid loss from such type of fluid in a manner such that the low fluid loss characteristics do not deteriorate with heating but, instead, frequently improve with heating.

Another object is to provide such a type of fluid which has rheological characteristics such that the use of heat-unstable fluid loss reducing agents is either not required or is in such small amounts that the cost thereof is not excessively high.

Another object is to provide a drilling and completion fluid in which clay can be maintained in a flocculated state with the aid of an alkaline earth metal salt and yet in which fluid loss control agents normally sensitive to such a salt can be effectively used.

It has now been found that when oil and a particular emulsifier are added to a flocculated clay type of well fluid, the fluid loss becomes markedly reduced and this effect frequently can be improved by heating. In fact, by using certain amounts of the emulsifier, the quantity of fluid loss reducing agent, such as CMC, which is usually required to maintain low fluid losses, is materially reduced and the need for it may be eliminated altogether. Further, the emulsifier has been noted to permit the use of such materials as sodium polyacrylate in systems containing alkaline earth metal salts as one of the flocculants. Apparently, the emulsifier in some way prevents the salts from reacting with the polyacrylate or the like so as to render the same completely ineffective. The particular emulsifier used in accordance with this invention comprises an oxyethylene adduct of a still bottoms derived from a process for making an alkylphenol.

Thus, it has been found that when the still bottoms adduct is added in proper amounts to this type of fluid, the fluid loss, upon heating, can be of the order of 3 ml. Such a fluid loss is experienced even in the absence of conventional fluid loss reducing agents such as CMC or "Cypan" (a polyacrylonitrile which has been about 90% hydrolyzed; see U.S. 2,718,497). Polyacrylic acid and hydrolyzed polyacrylamide can also be used. These and other similar materials, as well as Cypan, are referred to herein as "polyacrylate fluid loss reducing agent." They are water-soluble high molecular weight polymers having a molecular weight greater than 1,000 and usually in the range of 100,000 to 400,000. The lowered fluid loss is maintained even though the well fluid is continuously heated to temperatures of, for example, 350° F. The exact reason for this phenomenon is not known, but it is apparent that more is involved than the mere formation of an emulsion. Thus, other powerful emulsifiers have been tried and found to be ineffective in this role.

Before turning to a detailed description of each of the components of the fluid of this invention, a short discussion will be given of a preferred formula. Thus, a preferred fluid will comprise, at least initially, a clay, such as bentonite, dispersed in water along with a surfactant comprising phenol adducted with 30 mols of ethylene oxide per mol of phenol, and calcium sulfate or sodium chloride, the surfactant and calcium sulfate or sodium chloride preferably being present in excess of that required to flocculate the clay then in the system. This excess is desirably maintained so that drilled solids, as they enter the system, can either be flocculated or prevented from becoming hydrated. It is thought that the surfactant becomes adsorbed on the surfaces and interstices of the clay particles, thereby preventing their hydration and dispersion. As will be explained more fully hereinafter, CMC may be initially added to the well fluid not only to reduce its initial fluid loss but also to give the mud weight-suspending power where it is to be weighted. A minor amount of oil, for example 10%, is added to the mud along with the emulsifier of this invention. It has been found that in the absence of a conventional fluid loss reducing agent, the fluid loss exhibited by the mud of this invention is usually not as low as desired prior to heating. However, upon heating for a time, the fluid loss usually decreases.

WATER PHASE

Since the water phase serves as a solvent or supporting medium for the other components of the well fluid, the amount used will depend primarily upon the total volume of fluid to be compounded. It is possible to increase the water so as to water down the fluid and thereby decrease its viscosity and gel strength to some extent. The type of water can vary within wide limits, including fresh water, salt water, sea water, and, in general, any type of water having a pH less than 10. Further, the water phase can be derived from an ordinary water-base drilling mud provided that the pH of the mud is decreased to be less than 10 and, preferably, that any dispersant therein, such as quebracho, be permitted to decrease to a minimum value before the water-base mud is converted to the mud of this invention. In essence, then, the use of caustic and dispersants in the mud of this invention is to be avoided.

CLAY

When the well fluid is first compounded, a minimum amount of clay should be used—just enough to yield the desired viscosity and gel characteristics taking into consideration the effect of the other ingredients on these characteristics. As drilling proceeds, the light solids will increase and hence the viscosity will likewise increase although not nearly so much as it would increase if the solids were dispersed as in conventional systems. The drilled solids can be removed to control the viscosity. Thus the amount of clay can vary within wide limits depending upon the desired viscosity limits. Usually from 5 to 15 pounds per barrel of a hydratable clay such as bentonite will be satisfactory to initially compound the fluid. Other amounts of other clays can be used depending on the viscosity such clays impart to the fluid.

SURFACTANT

The primary role of this ingredient is to impart a desired flocculating effect on the clay with a minimum of foaming. It controls the rheological properties of the well fluid by strongly adsorbing on the clay surfaces and interstices. As the surfactant flocculates the clay, there results a reduced plastic viscosity, yield point and gel strength. This, of course, increases the tolerance of the fluid for light-weight solids such as drilled clay particles. The surfactant also inhibits the dispersing and swelling tendency of clays, such as hydratable shales, entering a mud system. As a result, massive hydratable shale formations can be easily drilled.

The class of surfactants useful for this purpose include both the nonionic and the ionic types. They are water-soluble organic compounds which are heat stable, i.e. stable to a temperature of at least 250° F. While all surfactants have some flocculating effect on clays, some are more efficient than others. It will therefore be understood that while this invention is applicable to all flocculated clay mud systems to reduce the fluid loss therefrom, it finds its most effective use in such systems flocculated by the more efficient flocculating surfactants. One reason for this is that the more efficient the flocculating action, the greater will be the fluid loss in the absence of a fluid loss control agent. Therefore, the oil-emulsifier combination of this invention will have its most marked effect in these highly flocculated systems.

There are a number of flocculated clay mud systems known to the art. One preferred one uses a flocculating surfactant which can be generally described as phenolic materials which have been water-solubilized by reacting with a water-solubilizing radical to form an adduct. Exemplary of this type of surfactant and a preferred species is phenol which has been adducted with about 30 mols of ethylene oxide per mol of phenol. The ethylene oxide chain imparts sufficient water-solubility to the phenol that the adduct is adsorbed on the surface of and in the interstices of the clay particles to flocculate the same. The amount of ethylene oxide adducted with the phenol can vary within limits, say from 20 to 50 mols per mol of phenol, but in any event it should be sufficient to render the phenol sufficiently water-soluble that it can be adsorbed on the clay particles. Adducts of phenolics other than phenol can also be used. Thus, alkylphenols wherein the alkyl group or groups have a total of from 1 to 10 carbon atoms (total for all groups) can be adducted with an oxyethylene, oxypropylene or mixtures thereof to act as the flocculating surfactant. Among such phenolic materials can be mentioned the various mono-alkylphenols ranging from methyl through decyl-phenol, including the branch chain isomers thereof, such as isohexylphenol. As a matter of fact, the alkyl groups having a carbon atom content in the upper part of the above range will usually be of the branched type. For example, one usable commercially available nonylphenol can be described as 3, 4, 5 methylhexylphenol. Whether or not the alkyl group is straight or branched chain does not seem to affect this invention. The selected number of carbon atoms need not all be disposed in a single alkyl group but can be in two or more so long as the total for all groups is in the above range. For example, dimethyl-, methylethyl-, ethylhexyl-, propylpentyl-, methyloctayl-, and other similar combinations or alkyl groups can be employed.

The alkyl or polyalkyl phenol should, like the phenol, be adducted with sufficient oxyethylene to render it water-soluble. An amount of oxyethylene within the range of 20 to 50 mols is usually sufficient, with amounts in the upper part of the range being used where the total number of carbon atoms in the alkyl group or groups are in the upper part of their range. For example, less oxyethylene is required to solubilize methylphenol than to solubilize nonylphenol. The exact amount of oxyethylene to be used in any particular case can be readily determined by a mere routine test. The ethylene oxide (oxyethylene) can in some cases be supplemented with or substituted by oxypropylene to give the desired solubility and molecular weight characteristics.

The mode of alkylating phenols to provide the above class of phenolic compounds is well known to those skilled in the art. Likewise, the adduction of these phenols with oxyethylene is also known. Many of the adducts are commercially available on the open market. Accordingly, further description of the mode of making these surfactants is not required. Further, other clay flocculating surfactants, both nonionic and ionic, can be used and the suitability of any particular surfactant for use in any particular system can be determined by mere routine test.

For example, salts of alkylene polyamines and of certain other organic nitrogen bases are excellent flocculating agents. Exemplary of such salts are those found by reacting acetic, hydrochloric, sulfuric, oxalic, adipic acids with ethylene diamine, diethylene triamine, triethylene tetramine, propylene diamine, tetrabutylene pentamine, dipropylene triamine, aniline, pyridine, long chain fatty acid amines, and the like. Generally the amine portion of these salts, when formed from the alkylene polyamine, can be said to comprise, per molecule, from 2 to 6 amino nitrogen atoms and from 1 to 5 alkylene groups having from 2 to 4 carbon atoms per group, the number of alkylene groups in any one instance being one less than the number of amino nitrogens. The extent of neutralization of the various amines or bases to form the salt can vary from 75 to 100 percent and preferably is about at least 90 percent. In this respect, an amine and an acid can be added as such to the mud to react in situ to form the salt of the amine. In many cases, it will be desirable to also add a polyanionic fluid loss reducing agent, such as CMC or a polyacrylate, to aid in the control of rheological properties.

Since this invention is useful in all flocculated clay solids or mud systems, the term "clay flocculating surfactant" will be used herein as applicable to any surfactant capable of converting (or maintaining) a hydratable clay in a flocculated state in a water phase to yield a "flocculated clay solid or mud" system as above defined.

The amount of surfactant to be used should be sufficient to flocculate the clay. As a practical matter, it is desired that an excess of surfactant be employed so that free surfactant is present in the water phase. This makes available a "reservoir" of surfactant for adsorption on new clay particles entering the mud system. Generally, the amount of surfactant to be used can be stated to be in the range of 1 to 15 pounds per barrel of fluid, depending upon the concentration of clay solids which are to be flocculated by the surfactant and upon the desired excess, i.e. free (unadsorbed) surfactant, if any. Preferably, 0.5 to 2.5 pounds per barrel of excess (free) surfactant is maintained.

SALTS

In some systems, water-soluble metal salts are preferably employed in conjunction with the surfactant to aid it in flocculating the clay although their use is optional unless the maximum flocculating action is desired or unless optimum rheological properties are required. Salt finds its most effective use with the phenol adduct type of flocculating surfactant but is also effective with the amine salt and other types. For the phenol type, the surfactant in itself will induce flocculation but it will be aided in this respect to a degree by the addition of a salt. Salt in general, in the absence of this type of surfactant, reduces plastic viscosity but increases the yield point and gel strength. When used with this surfactant, the viscosity, yield point and gel strength are all markedly reduced even more than with the surfactant alone. Generally, any common electrolyte or water-soluble metal salt which can flocculate the clay can be used, including the alkali metal and alkaline earth metal salts such as sodium chloride, potassium chloride, calcium chloride, barium chloride, calcium sulfate, etc. The selected salt should have a solubility of at least 1000 p.p.m. so that enough ions will be present to effectively aid the surfactant in flocculating the clay.

The amount of salt to be used can vary over a reasonably broad range and should be sufficient so that in conjunction with the surfactant, the desired degree of flocculation of the clay is obtained. Generally, an amount within the range of 0.3 (approximately 1000 parts per million) to 15 pounds per barrel can be used (based upon a 350 pound barrel). Where the salt is an alkali metal salt, such as sodium chloride, it is preferred to choose an amount from the lower portion of such range, as for example, from the more limited range of 0.3 to 7 pounds per barrel and still more preferably from the range of 0.3 to 3 pounds per barrel. It has been found that as the sodium chloride concentration increases, the effectiveness of the emulsifier of this invention decreases somewhat. Therefore, best results are obtained in the so-called "low sodium" systems.

When an alkaline earth metal salt is to be used, calcium sulfate is preferred. One reason is that calcium salts will convert clays such as bentonite to the calcium form which is usually less hydratable than is the sodium form. Another reason is that calcium sulfate has a limited solubility in water so that an excess of undissolved calcium sulfate can be maintained as a reservoir for treatment of clays entering the system without greatly increasing the amount actually in solution. This is particularly important where the resistivity of the mud is to be maintained for electric logging. In ordinary practice, from 1 to 15 pounds per barrel of calcium sulfate is preferably used. However, as indicated above, the amount of salt can vary over a wide range without departing from the spirit of this invention.

The invention finds particular applicability to surfactant muds made from sea water. The latter includes a mixture of various salts including about 3.5 percent of sodium chloride and approximately 1000 parts per million of calcium. Further, brackish waters can be used. Also, ordinary water base muds will often contain salt, e.g. 1000 to 10,000 p.p.m. or more, so that they can be converted, even when the use of salt is desired, without further addition of salt. Accordingly, the source of the salt is unimportant.

As indicated above, the emulsifier of this invention tends to maintain the fluid loss reducing efficiency of polyacrylates and of other calcium sensitive fluid loss reducing agents in the presence of calcium or other alkaline earth metal ions. Thus the emulsifier permits the use of such agents in both alkaline earth metal surfactant muds and in alkali metal surfactant muds. However, where a minimum fluid loss is desired, it is advisable to use the so-called low sodium surfactant mud. In such, the alkali metal salt concentration is maintained within the range of 2000 to 20,000 parts per million, soluble alkaline earth metal ions at a minimum (e.g. below 300 parts per million of alkaline earth metal ions in the aqueous phase) so that a polyacrylate fluid loss reducing agent can be used with a minimum of interference from the alkaline earth metal ions. The alkaline earth metal ions can be maintained at such minimum by suitable treatment with a precipitating agent, as for example, calcium can be precipitated by sodium carbonate, etc. Of course, where such procedure is used, the amount of precipitating agent used can be determined by routine tests on the mud to find the quantity required to precipitate any excess quantity of alkaline earth metal ions in the mud.

OIL PHASE

The oil to be used can comprise any mineral oil conventionally used in forming oil-base or emulsion drilling muds. For example, diesel oil, crude oil, gas oil, kerosene, and others are usabe. The amount to be used should be at least 1% and preferably within the range of 1%–20% by volume. As a practical matter, at least 5% will usually be used, and it has been found that oil concentrations in the range of 10%–15% produce maximum results. As will be seen below, there are indications that minimum fluid losses are obtained in some muds with about 15% by volume of oil, but this will vary with different muds. Since the viscosity of the mud increases with increasing oil concentrations, amounts greater than 20 volume percent are not ordinarily preferred.

EMULSIFIER

The principal effect caused by the emulsifier of this invention is a marked reduction in fluid loss from the well fluid. Fluid losses of the order of 3 ml. have been achieved, and these losses remain of relatively low order despite continued heating of the well fluid. In fluocculated clay systems, fluid losses will ordinarily be relatively high unless some sort of control is provided. CMC has been used, but it apparently degrades with heating and so it must be constantly added in order to maintain a low fluid loss. Cypan ordinarily does not yield as low fluid losses as CMC and frequently it too seems to lose its effectiveness with passage of time at elevated temperatures. The emulsifier of this invention can be used either alone to control fluid loss or in conjunction with Cypan, CMC or other fluid loss reducing agents. When used with CMC, the amount required of the latter is greatly reduced and so the constant addition thereof is at a lesser expense.

The emulsifier can be described as an oxyethylene adduct of a still bottoms derived from a phenol alkylation process. In such a process, phenol is alkylated with an alkylene of desired chain length and configuration to yield predominantly the corresponding alkylphenol and dialkylphenol. There also occurs a residue comprising compounds of higher boiling point than that of the dialkylphenol. The exact composition of this residue is not known but it is known that it is a product of the aforementioned phenol alkylation process. In any event, the alkylate comprising alkylphenol, dialkylphenol and residue is fractionated to recover an overhead product or products. The first principal cut to be recovered will be the alkylphenol although this may be preceded by small amounts of unreacted alkylene or phenol or both. If the the fractionation is stopped at this point, as it frequently is in commercial practice, the remaining bottoms product will comprise the residue, dialkylphenol and any alkylphenol which did not pass out as overhead. Of course, the relative proportions of these three components will vary with the efficiency of the alkylation process and of the fractionation step. A preferred emulsifier is an oxyethylene adduct of a still bottoms derived from a process for producing nonylphenol, the still bottoms being adducted with from 1.5 to 3, preferable 2, parts of oxyethylene per part of still bottoms. As will be more fully described below, such nonylphenol still bottoms usually is comprised of three principal components, namely nonylphenol, dinonylphenol and a residue. For the reduction of fluid loss and the maintenance of a low fluid loss when the mud is heated for long periods of time, it has been found that the oxyethylene adduct to the residue is the most powerful of these three components. The dinonylphenol adduct is somewhat less efficient and tends to lose its effectiveness in muds exposed to elevated temperatures somewhat more rapidly than the residue adduct. The nonylphenol adduct seems to contribute little if anything toward fluid loss control at elevated temperatures and therefore may be considered somewhat as a diluent occurring in the still bottoms primarily because it is not economical to completely remove it.

The nonylphenol still bottoms, which is a commercially available product, is presently derived as a by-product in the preparation of nonylphenol. In such preparation, one common practice is to polymerize propylene to provide a nonene comprising a very high percentage of nine carbon chain trimer. Other nonenes can be used. The nonene is then reacted with phenol in the presence of a catalyst, such as sulfuric acid or boron tri-fluoride. There results a mixture of alkylated phenols which is distilled to produce an overhead product comprising relatively pure nonylphenol. The still bottoms from this fractionation comprises a portion of the nonylphenol not distilled over as overhead plus dinonylphenol and the higher boiling residue which may contain polymerized phenols, alkylates of phenols which are higher boiling than dinonylphenol, complex benzene compounds, and the like. The residue has a boiling point higher than dinonylphenol.

It will be apparent that the amount of nonylphenol in the still bottoms will vary with the efficiency of the alkylation process and of the subsequent fractionation step. By suitable fractionation procedure, the nonylphenol can be completely removed, leaving the still bottoms comprising dinonylphenol and residue. With still further fractionation, a part or all of the dinonylphenol can be removed leaving a still bottoms comprising a purified or a substantially pure residue. Such fractionation usually is conducted under a vacuum of say 10 to 20 mm. Hg pressure and at a fractionator head temperature of at least 200° C., such temperature being determined by the boiling point of the fraction desirably removed overhead. The still bottoms, comprising the residue and dinonylphenol, if any, and the diluent nonylphenol, if any, is then reacted with oxyethylene to increase its water solubility. The amount so reacted should be in the range of 1.5 to 3, preferably 2, parts by weight per weight of the still bottoms being adducted. Where the still bottoms is rich in residue, the amount of oxyethylene should be chosen from the higher portion of such range and where it becomes richer in dinonylphenol or in nonylphenol, the amount may be chosen from a lower portion of the range.

The alkylate from the nonylphenol process should be fractionated until at least 50% of the nonylphenol produced from the process is removed as an overhead leaving the remainder as still bottoms. Stated numerically, the nonylphenol still bottoms can comprise the residue, either pure or mixed, for each part of weight of residue, with from 0 to 5 parts of dinonylphenol, and/or with 0 to 10 parts of nonylphenol, the residue in any case being present in an amount of at least 5 weight percent of the total still bottoms. Either or both dinonylphenol or nonylphenol can be mixed with the residue. The amount of oxyethylene used in any case is based upon the total still bottoms weight.

One specific still bottoms contains 20 percent nonylphenol, 50 percent dinonylphenol and 20 percent residue and many will contain from about 15 percent to about 30 percent nonylphenol with the balance being dinonylphenol and residue, the dinonylphenol comprising the major portion of the balance with the residue varying from at least 5 percent to as high as 20 percent or more.

The emulsifier can be prepared by reacting the residue, if the nonylphenol and dinonylphenol have been distilled therefrom as above-described, or by reacting the still bottoms containing the residue in admixture with either or both of nonylphenol and dinonylphenol which may be present, with oxyethylene to increase its water-solubility. The adducting reaction is well known to those skilled in the art and one such adduct is now available as OX-153 1:2. It is a still bottoms made by the above-described nonylphenol process and is adducted with 2 parts by weight of ethylene oxide per weight of still bottoms. The residue or still bottoms can be further adducted with oxypropylene or higher oxyalkylenes to yield the desired solubility and molecular weight characteristics, the oxyethylene still being used as aforesaid to increase the water solubility of the hydrophobic radical.

Other phenol alkylate still bottoms, either as a purified residue or containing residue and one or both of mono-alkyl- and dialkyl-phenols can be used. Generally, these still bottoms are derived from processes for alkylating phenol with alkylene wherein the alkylene reactant contains a number of carbon atoms selected from the range of 4 to 20 carbon atoms. The alkylene reactant can be either branched or straight chained. Exemplary of this class are still bottoms derived from phenol alkylation with butene, pentene, hexene, octene, nonene, pentadecene, hexadecene, octadecene, etc. Since the disclosure given above with respect to the nonylphenol still bottoms and the adduct prepared therefrom applies to each still bottoms and its adduct falling within the class of still bottoms and adducts herein disclosed, further description is not necessary except to point out that it is preferred that as the molecular weight of the alkylene reactant is increased, the amount of oxyethylene is likewise increased.

In view of the foregoing, the term "alkyl phenol still bottoms" will be used herein to embrace all of those derived from the processes for alkylation of phenol with $C_4$ to $C_{20}$ alkylenes to produce one or both of corresponding monoalkyl- and a dialkylphenol as above disclosed where such still bottoms comprises a residue, either in a substantially pure form or mixed with from 0 to 5 parts of said corresponding dialkylphenol and/or with 0 to 10 parts of said corresponding monoalkylphenol, the residue in any case being present in the still bottoms in an amount of at least 5 weight percent of the total still bottoms, said residue having a boiling point or range higher than that of said corresponding dialkylphenol.

The amount of emulsifier employed should be within the range of 0.2 to 10 pounds per barrel of well fluid and preferably is at least 0.2 pound for each percent of oil employed. For example, 3 pounds per barrel of emulsifier works very well with 10% of oil. It has been found that while amounts of emulsifier below 1 pound per barrel and at least this amount is preferred, give some fluid loss reduction, amounts in excess of 1 pound per barrel are more appropriate since relatively low fluid loss values are obtained. Amounts in excess of 10 pounds per barrel are usually uneconomical. It has also been found that after the emulsifier has been added to the fluid system, the desired fluid loss reduction is achieved after the emulsifier has been permitted to react with the system for a period of time. Such reaction is greatly accelerated by heating the system to an elevated temperature, say in excess of 250° F. but below 550° F. Accordingly, it is one step of the process of this invention that the system containing the emulsifier be heated to achieve the low fluid losses. It has also been found that as the amount of emulsifier is increased, the heating period should also be increased to achieve minimum fluid losses. The temperature of heating may conveniently be 250° F. or more for at least 24 hours although lower temperatures can be used with longer heating times.

In giving the concentration or amounts of emulsifier to be used, it will be understood that the above figures apply to the adduct of the "alkylphenol still bottoms" as above defined. Of course, as the concentration of the residue in the still bottoms increases, lesser amounts of adduct will be required to obtain the same fluid loss control. Similarly, as the monoalkyplhenol concentration increases, larger amounts of the still bottoms adduct will be desired. In any event, the optimum amount to be used in any particular system can be readily determined by routine test.

OTHER FLUID LOSS REDUCING AGENTS

In some cases, such as to achieve an unusually low fluid loss with a minimum amount of emulsifier, or to impart increased weight-suspending ability to the well fluid, or to otherwise improve the rheological properties of the fluid, CMC, polyacrylate or other fluid loss reducing agents can be employed. The amount should be to achieve the desired effect and will usually be from 1 to 10 pounds per barrel. Of course, continuous addition of CMC will be required where high temperatures are encountered since CMC decomposes or loses its effectiveness over a period of time at high temperatures. This is not always true of Cypan.

FOAM SUPPRESSORS

The surfactants described above, being highly water-soluble, may cause foaming of the fluids. To suppress this, a foam suppressor can be added. Generally, these can be the same type of compounds as the surfactants except that their water solubility is reduced such as by making the oxyethylene chain much shorter. Hence, these suppressors can be said to be oil-soluble. An example thereof is nonylphenol adducted with one mol of ethylene oxide. A preferred surfactant mix comprises about 56 percent phenol adducted with 30 mols of ethylene oxide, 4 percent nonylphenol adducted with 1 mol ethylene oxide and 40 percent of water. These proportion can be varied as desired.

PROCEDURE OF COMPOUNDING AND USING

In making up the fluid of this invention, it is usually preferred that the clay solids in a system be prehydrated, i.e., permitted to hydrate before any of the salts, surfactant, oil or emulsifier are added. New mud can be prepared by dispersing the clay in the water and then agitating for several hours, say 1 to 4. Also, existing fresh water mud can be employed provided that the caustic and dispersant content has been permitted to be depleted or the mud is watered back to reduce the concentration thereof. In any event, the hydrated clay-water mixture has the selected salt, if any, added thereto, such as calcium sulfate, and this is permitted to react with clay. Then, preferably, a conventional fluid loss reducing agent, such as CMC or Cypan, can be added, not only to control the fluid loss if the fluid is being circulated through the well but also to impart weight-suspending ability to the fluid. This addition can be followed by barite or other weighting agents to give the desired weight. Thereupon the surfactant is added, followed by the oil and the emulsifier. It is preferred that the oil and emulsifier be mixed together and then the mixture added to the previously mixed ingredients. Bringing the emulsifier in with the oil gives lower fluid losses and a superior mud contrasted to bringing in the oil and emulsifier separately. After the emulsifier has been added, the mud is preferably heated as aforesaid, either by artificial means or by circulating through a well having a sufficiently high bottom-hole temperature, e.g. in excess of 250° F.

When the polyamine salt type of surfactant is employed, it is preferable to add it to the base mud and then added a polyanionic fluid loss control agent to improve rheological properties. Salt need not be added.

While the above is a preferred mode of compounding the well fluid, it is not necessarily the only one and is given merely for illustrative purposes.

In using the mud, salt, if any, and surfactant are added as needed preferably to maintain a free excess thereof available for reaction with clay solids entering the system. These clay solids are removed as required to control viscosity at a reasonably low value. Centrifugation can be used for this purpose. Additional emulsifier can also be added to maintain a desirably low fluid loss and certainly should be added if free oil appears in the mud pits. Caustic and dispersants should not be used.

ILLUSTRATIVE DATA

*Example 1*

Ten pounds of bentonite (sodium montmorillonite) were mixed for three hours with one barrel equivalent of water. Nine pounds per barrel of calcium sulfate (anhydrous) were then added to the prehydrated bentonite and stirred for an additional three hours. Seven pounds per barrel of a surfactant were then added and stirring continued for 20 minutes. The surfactant comprised a blend of 56% of phenol adducted with 30 mols of ethylene oxide, 4% of phenol adducted with between 1 and 2 mols ethylene oxide and 40% water. The nonylphenol adduct was employed to decrease foaming of the mixture. Sufficient barite was then added to weight the mud to 17 pounds per gallon, whereupon 10% by volume of diesel oil was added and stirred into the mixture for 10 minutes. Varying amounts of OX–153 1:2 were then added as indicated in the following Table I. This OX–153 1:2 is an emulsifier prepared by adducting still bottoms from the nonylphenol process described above (reported to comprise 50 percent nonylphenol, 30 percent dinonylphenol and 20 percent residue) with two weights of ethylene oxide per weight of still bottoms. The resulting fluid was then divided into seven different portions for each concentration of emulsifier, and six of the seven portions were placed in an oven and heated at 350° F. for the indicated times. The portions were stirred continuously during the heating. The results were as follows:

TABLE I

| Emulsifier Concentration, lbs./bbl. | Fluid Loss (ml.) after sample heated at 350° F. for | | | | | | |
|---|---|---|---|---|---|---|---|
| | 0 Days | 1 Day | 2 Days | 3 Days | 4 Days | 5 Days | 6 Days |
| 5 | 37 | 22 | 37 | 23 | 23 | 24 | 25 |
| 10 | 38 | 24 | 24 | 12 | 16 | 17 | 23 |
| 15 | 39 | 22 | 23 | 26 | 3 | 5 | 4 |
| 20 | 31 | 21 | 21 | 30 | 38 | 21 | 16 |

The apparent viscosity of the samples whose fluid losses are reported in Table I are shown in Table II.

TABLE II

| Emulsifier Concentration, lbs./bbl. | Apparent Viscosity (cps.) After Sample Heated at 350° F. for | | | | | | |
|---|---|---|---|---|---|---|---|
| | 0 Days | 1 Day | 2 Days | 3 Days | 4 Days | 5 Days | 6 Days |
| 5 | 34 | 28 | 24 | 21 | 28 | 27 | 24 |
| 10 | 33 | 23 | 24 | 21 | 28 | 24 | 25 |
| 15 | 33 | 22 | 22 | 20 | 43 | 23 | 23 |
| 20 | 30 | 26 | 25 | 24 | 25 | 25 | 25 |

To demonstrate that the fluid loss depression is not obtained when the monoalkylphenol component of the still bottoms adduct is separately used, nonylphenol adducted with 30 mols of ethylene oxide per mol of nonylphenol was obtained. A series of samples, made up exactly as those reported in Table I, had varying amounts of the nonylphenol-30 mol adduct added as indicated in Table III. This adduct was added as a 66% solution in water. The results of the heating were as follows:

TABLE III

| Emulsifier Concentration, lbs./bbl. | Fluid Loss (ml.) after sample heated at 350° F. for | | | | | | |
|---|---|---|---|---|---|---|---|
| | 0 Days | 1 Day | 2 Days | 3 Days | 4 Days | 5 Days | 6 Days |
| 5 | 39 | 55 | 52 | 64 | 58 | 65 | 60 |
| 10 | 40 | 70 | 53 | 63 | 52 | 56 | 57 |
| 15 | 46 | 54 | 61 | 66 | 56 | 65 | 56 |
| 20 | 35 | 70 | 57 | 66 | 65 | 56 | 54 |

By comparing Tables I and III, the unique nature of the still bottoms adduct in effecting lower fluid losses, particularly at the 15 pounds per barrel concentration and after heating for more than three days, will be readily apparent. Further, it will be noted that without a single exception, heating the mud containing the nonylphenol-30 mol adduct caused an increased fluid loss. On the other hand, heating the muds containing the still bottoms adduct always resulted in a reduced fluid loss with the single exception of the four-day measurement of the 20 pound per barrel mud sample.

*Example 2*

To show that even small concentrations of OX-153 1:2 are effective in reducing the amount of fluid loss reducing agent required to be added from time to time, samples were made up in the same manner as for Example 1 except that one pound per barrel of the indicated emulsifier was used and 3 pounds per barrel of the indicated fluid loss reducing agent was added after the calcium sulfate but before the surfactant. The results are shown in Table IV.

TABLE IV

| Sample | Fluid Loss (ml.) after sample heated at 350° F. for | | |
|---|---|---|---|
| | 0 Days | 1 Day | 3 Days |
| CMC—NP30 [1] | 2.8 | 51 | 100% |
| CMC—OX-153 1:2 | 3.3 | 8.2 | 53 |
| Cy [2]—NP30 [1] | 21 | 59 | 70 |
| Cy [2]—OX-153 1:2 | 11 | 24 | 27 |
| CMC | 5.6 | 41 | |
| Cy [2] | 37 | 62 | |

[1] Nonylphenol adducted, with 30 mols ethylene oxide.
[2] Cypan.

From this table it will be seen that the OX-153 1:2 maintained the fluid loss at a lower value than did the NP-30 thereby requiring smaller additions of the agent, particularly the CMC, per unit of time. The samples with CMC and Cypan alone (without emulsifier) show that the OX-153 1:2 was active, even at one pound per barrel, in maintaining lowered fluid losses.

*Example 3*

To show the effect of varying the amount of oxyethylene adducted with the still bottoms, the tests reported in Table V were run. The samples for these tests were made up as in Example 1 except that the fluid loss control agent indicated in Table V was added after the calcium sulfate but before the surfactant in the amount indicated. The various amounts of the different emulsifiers shown in the table were added after the oil, as in Example 1.

TABLE V

| Fluid Loss Reducer | | Emulsifier | | Fluid loss (ml.) upon heating at 300° F. for | | |
|---|---|---|---|---|---|---|
| Type | lbs./bbl. | Type | lbs./bbl. | 0 hrs. | 24 hrs. | 72 hrs. |
| Blank | | OX-153 1:1 | 1 | 75 | 92 | |
| CMC | 3 | OX-153 1:1 | 1 | 2.8 | 76 | |
| Cypan | 3 | OX-153 1:1 | 1 | 35 | 34 | |
| Blank | | OX-153 1:2 | 1 | 34 | 42 | 45 |
| CMC | 3 | OX-153 1:2 | 1 | 2.5 | 8 | 13.2 |
| Cypan | 3 | OX-153 1:2 | 1 | 6.3 | 14 | 18 |
| Blank | | OX-153 1:3 | 1 | 39 | 65 | 74 |
| CMC | 3 | OX-153 1:3 | 1 | 2.3 | 41 | 19 |
| Cypan | 3 | OX-153 1:3 | 1 | 9.2 | 24 | 27 |
| Blank | | NP-30 | 1.43 | 53 | 73 | 99 |
| CMC | 3 | NP-30 | 1.43 | 2.8 | 49.5 | |
| Cypan | 3 | NP-30 | 1.43 | 25 | 76 | 74 |

From this table, where low concentrations of emulsifier were used to gain the desired sensitivity, it can be seen that both the adducts of the still bottoms from the nonylphenol process adducted with two parts by weight and three parts by weight of oxyethylene are superior to the nonylphenol adducted with the 30 mols of oxyethylene. In this connection, the OX-153 1:1 and OX-153 1:3 are identical to the OX-153 1:2 except that they contain one part by weight and three parts by weight, respectively, of oxyethylene per weight of still bottoms. The larger amount of NP-30 (nonylphenol adducted with 30 mols of ethylene oxide) was added since this compound was used as a 70% solution. Accordingly, its concentration as an active ingredient in the fluid was one pound per barrel just as in the case of the OX-153 compounds.

*Example 4*

The effect of varying oil concentrations is shown in Table VI. The muds tested were made up as in Example I except the amount of oil was varied as indicated and 5 pounds per barrel of OX-153 1:2 were used throughout. The various samples were heated at 350° F. (with constant agitation) for the times indicated, cooled and their properties measured.

TABLE VI

| Days Heated | 10% Diesel Oil | | 15% Diesel Oil | | 20% Diesel Oil | |
|---|---|---|---|---|---|---|
| | Fl. L, ml. | Visc., Cps. | Fl. L, ml. | Visc., Cps. | Fl. L, ml. | Visc., Cps. |
| 0 | 21 | 36 | 9 | 45 | 47.5 | 52 |
| 1 | 17.5 | 27 | 10.5 | 37 | 60 | 46 |
| 2 | 31 | 27 | 16 | 42 | 64 | 45 |
| 3 | 21 | 25 | 7.5 | 35 | 68 | 46 |
| 4 | 33 | 24 | 11 | 34 | 70 | 41 |
| 5 | 31.5 | 25 | 12 | 34 | 70 | 47 |
| 6 | 26 | 27 | 12 | 34 | 52 | 42 |

From this table, it can be seen that for the particular amount of emulsifier employed, 15% by volume of oil consistently gave the lowest fluid loss. Also, as the amount of oil was increased, the viscosity likewise increased.

*Example 5*

Samples of muds were compounded as described in Example 1 except 20 pounds per barrel of bentonite were used and the mud was weighted to only 12 pounds per gallon. No fluid loss reducing agent such as CMC or Cypan was used.

TABLE VII

| Emulsifier | Properties Before Heating | | Properties After Heating 24 Hrs. at 350° F. w/agitation | |
|---|---|---|---|---|
| | Fl. L, ml. | Visc., Cps. | Fl. L, ml. | Visc., Cps. |
| 1 lb./bbl. NP-30 | 40 | 66 | 55 | 55 |
| 5 lb./bbl. OX-153 1:2 | 17 | 32 | 29 | 23 |
| 10 lb./bbl. OX-153 1:2 | 10 | 27 | 4 | 19 |

This indicates that for lower weight muds, higher concentrations of emulsifier should be used to obtain minimum fluid losses.

*Example 6*

To demonstrate that mixtures of adducts of nonylphenol and dinonylphenol with ethylene oxide, in the absence of the residue adduct, will not alone contribute the maximum desired fluid loss control, a mixture of 65% dinonylphenol, 20% nonylphenol and 15% of an inert aromatic solvent (nonphenolic) was adducted with 2 parts by weight of ethylene oxide per part by weight of such mixture. This corresponded to the OX-153 1:2 reported above except that the residue was substituted by the inert solvent. The adducted mixture (OX-626) was then tested in the amounts indicated in mud samples prepared in accordance with Example 1 except for the substitution of OX-626 for OX-153 1:2. The properties were:

PROPERTIES

| OX-626 lbs./bbl. | Before Heating | | Heated 24 Hrs. at 350° F. | | Heated 72 Hrs. at 350° F. | |
|---|---|---|---|---|---|---|
| | Fl. L, ml. | Visc., Cps. | Fl. L, ml. | Visc., Cps. | Fl. L, ml. | Visc., Cps. |
| 5 | 27 | 42 | 75 | 38 | 75 | 32 |
| 10 | 30 | 46 | 70 | 33 | 70 | 28 |
| 15 | 28 | 42 | 60 | 33 | | |
| 20 | 29 | 48 | 60 | 34 | | |

*Example 7*

A field mud from a well being drilled and of the low sodium surfactant type was obtained. It had been prepared from sea water and contained 3.15 lbs./bbl. of phenol-30 mol oxyethylene adduct (surfactant), 3% by volume of oil 34,650 p.p.m. sodium chloride, 29% solids, an unknown amount of CMC and had a weight of 15.3 p.p.g. Samples of this mud were treated in the manner shown in Table VIII with the results shown.

TABLE VIII

| Additions to field Mud Samples | Before Heating | | | Heated 60 hrs. at 350° F. | | |
|---|---|---|---|---|---|---|
| | Visc. | Gels, 0/10 min. | Fl. L | Visc. | Gels, 0/10 min. | Fl. L |
| None | 53 | 9/34 | 3.4 | 40.5 | 15/24 | 60 |
| 5 lbs./bbl. OX-153 1:2 | 37.5 | 3/23 | 1.2 | 17 | 1/2 | 46.5 |
| 13% diesel oil | 85 | 15/48 | 2.9 | 107 | 38/51 | 33 |
| 5 lbs./bbl. OX-153 1:2 plus 13% diesel oil | 57.5 | 5/25 | 0.9 | 20 | 2/3 | 5.2 |

*Example 8*

A surfactant mud was made up from 20 lbs./bbl. bentonite, 7 lbs./bbl. sodium chloride, 8 lbs./bbl. of the surfactant mix identified in Example 1, enough barite to give a weight of 15.5 p.p.g., 10% by volume of diesel oil and 5 lbs./bbl. of the emulsifier identified in Table IX. The procedure of mix was as set out in Example 1. The properties, both before and after heating are shown in Table IX. It will be noted that no calcium salt, CMC, Cypan or other conventional fluid loss reducing agent was used.

TABLE IX

| Emulsifier | Before Heating | | | Heated 24 hrs. at 350° F. | | |
|---|---|---|---|---|---|---|
| | Visc. | Gels, 0/10 min. | Fl. L | Visc. | Gels, 0/10 min. | Fl. L |
| NP-30 | 99 | 10/22 | 14.4 | 29 | 1/8 | 47 |
| OX-153 1:2 | 101 | 16/41 | 15.0 | 25 | 2/12 | 2 |

*Example 9*

A flocculated mud was prepared by adding to a field mud, 1 lb./bbl. of triethylenetetramine, 1.5 lbs./bbl. of acetic acid, 2.5 lbs./bbl. Cypan, 10% by volume of diesel oil. 3 and 5 lbs./bbl. of OX-153 1:2 were then added to different samples which were heated, along with a blank for 24 hours at 350° F. The blank had a fluid loss of 56 ml. whereas the samples containing 3 and 5 lbs./bbl. of OX-153 1:2 had fluid losses of 44 and 25 respectively. Other samples in which 2 lbs./bbl. of CMC was substituted for the Cypan and the temperature of heating decreased to 300° F. had fluid losses ranging from 100% with no emulsifier to 42 ml. with 5 lbs./bbl. of OX-153 1:2.

All tests reported herein were run in accordance with API RP 29, 3d edition, May 1950. Also, the residue content of the still bottoms from which was prepared the OX-153 1:2 used in the above tests, was approximately 15% while the balance was about 65% dinonylphenol and 20% nonylphenol. The amounts of emulsifier used in the tests is reported in terms of the OX-153 1:2 and to arrive at the amount of residue adduct per se, the figures should be multiplied by 0.15. All percentages and parts, unless otherwise stated, are by weight.

This application is a continuation-in-part of copending application Serial No. 610,662, filed September 18, 1956, and now abandoned.

From the foregoing it will be seen that this invention is one well adapted to attain all of the ends and objects hereinabove set forth, together with other advantages which are obvious and which are inherent to the composition and method.

It will be understood that certain features and subcombinations are of utility and may be employed without reference to other features and subcombinations. This is contemplated by and is within the scope of the claims.

The invention having been described, what is claimed is:

1. A fluid useful in drilling and completing wells which comprises, in combination a mixture in water of: a clay; a surfactant comprising an oxyethylene adduct of a compound selected from the group consisting of phenol and alkylphenol, any alkyl group of the latter containing a total of from 1 to 10 carbon atoms and said oxyethylene being present in an amount in the range of 20 to 50 mols per mol of said compound; from 0.3 to 15 pounds per barrel of a water-soluble salt selected from the group consisting of alkali metal salts and alkaline earth metal salts; from 1 to 20 volume percent of mineral oil dispersed in said water; and from 0.2 to 10 pounds per barrel of an emulsifier comprising "alkyl phenol still bottoms" adducted with 1.5 to 3 parts by weight of oxyethylene per part by weight of said "alkyl phenol still bottoms."

2. A fluid useful in drilling and completing wells which comprises, in combination, a mixture in water of: a clay; a surfactant comprising an oxyethylene adduct of a compound selected from the group consisting of phenol and alkylphenol, any alkyl group of the latter containing a total of from 1 to 10 carbon atoms and said oxyethylene being present in an amount in the range of 20 to 50 mols per mol of said compound; from 0.3 to 15 pounds per barrel of a water-soluble alkali metal salt; from 1 to 20 volume percent of mineral oil dispersed in said water; and from 0.2 to 10 pounds per barrel of an emulsifier comprising "alkyl phenol still bottoms" adducted with 1.5 to 3 parts by weight of oxyethylene per part by weight of said "alkyl phenol still bottoms."

3. The fluid of claim 2 wherein said water is sea water and said salt is derived at least in part from said sea water.

4. The fluid of claim 2 in combination with 1 to 10 pounds per barrel of a water-soluble polyacrylate fluid loss reducing agent and sufficient of a calcium precipitating agent to maintain the soluble calcium ion concentration in the fluid below 300 parts per million.

5. The fluid of claim 2 wherein said surfactant is phenol adducted with from 20 to 50 mols oxyethylene per mol of phenol, said salt is present in an amount within the range of 0.3 to 7 pounds per barrel and said emulsifier is nonylphenol still bottoms adducted with from 1.5 to 3 parts by weight of oxyethylene per weight of said bottoms, said bottoms comprising a residue having a boiling point higher than that of dinonylphenol, from 0 to 5 parts by weight of dinonylphenol per part of residue and from 0 to 10 parts by weight of nonylphenol per part of residue, the residue being present in the still bottoms in an amount of at least 5 weight percent, said still bottoms being derived by alkylating phenol with nonene and fractionating the alkylate to remove sufficient alkylphenols to yield said bottoms as aforesaid.

6. The fluid of claim 5 in combination with 1 to 10 pounds per barrel of a water-soluble polyanionic fluid loss reducer.

7. A fluid useful in drilling and completing wells which comprises, in combination, a mixture in water of: a drilling mud clay; from 1 to 15 pounds per barrel of calcium sulfate; from 1 to 15 pounds per barrel of phenol adducted with about 30 mols of ethylene oxide per mol of phenol; the amount of calcium sulfate and phenol adduct being chosen from the aforesaid ranges therefor such that free calcium sulfate and phenol adduct are present in said water; from 1 to 20 volume percent of oil dispersed in said water; and from 0.2 to 10 pounds per barrel of an emulsifier comprising a residue adducted with from 1.5 to 3 parts by weight of oxyethylene per weight of said residue, the residue comprising a mixture of components having a boiling point higher than that of dinonylphenol with the mixture being derived by alkylating phenol with nonene, fractionating the alkylate to remove at least some of the nonylphenol and to yield a bottoms product containing said residue, any nonylphenol and dinonylphenol in said bottoms product also being adducted with from 1.5 to 3 parts by weight of said oxyethylene per weight of the nonylphenol and dinonylphenol so that the average oxyethylene content of the entire bottoms product adduct is from 1.5 to 3 parts by weight.

8. The fluid of claim 7 wherein said bottoms product comprises about 95% to 80% of a mixture of mononylphenol and dinonylphenol and about 5% to 20% of said residue.

9. The fluid of claim 7 wherein said bottoms product is adducted with about 2 parts by weight of ethylene oxide per weight of said bottoms product.

10. A fluid useful in drilling and completing wells which comprises, in combination, a mixture in water of a clay; from 1 to 15 pounds per barrel of a water-soluble alkaline earth metal salt capable of flocculating said clay; from 1 to 15 pounds per barrel of phenol adducted with from 20 to 50 mols of ethylene oxide per mol of phenol; the amounts of said salt and of said phenol adduct being selected from the respective ranges therefor such that said clay is maintained in a flocculated state; from 1 to 20 volume percent of mineral oil dispersed in said water; and from 0.2 to 10 pounds per barrel of an emulsifier comprising a residue adducted with from 1.5 to 3 parts by weight of oxyethylene per weight of said residue, the residue comprising a mixture of components having a boiling point higher than that of dinonylphenol with the mixture being derived by alkylating phenol with nonene, fractionating the alkylate to remove at least some of the nonylphenol and to yield a bottoms product containing said residue, any nonylphenol and dinonylphenol in said bottoms product also being adducted with from 1.5 to 3 parts by weight of said oxyethylene per weight of the nonylphenol and dinonylphenol so that the average oxyethylene content of the entire bottoms product adduct is from 1.5 to 3 parts by weight.

11. The fluid of claim 10 wherein said salt is calcium sulfate and wherein a fluid-loss-reducing agent comprising a water-soluble carboxyalkylcellulose is admixed with said water in an amount sufficient to reduce the fluid loss to be less than that effected without said fluid-loss reducing agent.

12. A fluid useful in drilling and completing wells which comprises, in combination, a mixture in water of clay; from 1 to 15 pounds per barrel of phenol adducted with from 20 to 50 mols of oxyethylene per mol of phenol; the amount of phenol adduct being selected from the range therefore such that said clay is maintained in a flocculated state; from 1 to 20 volume percent of mineral oil dispersed in said water; and from 0.2 to 10 pounds per barrel of an emulsifier comprising a residue adducted with from 1.5 to 3 parts by weight of oxyethylene per weight of said residue, the residue comprising a mixture of components having a boiling point higher than that of dinonylphenol with the mixture being derived by alkylating phenol with nonene, fractionating the alkylate to remove at least some of the nonylphenol and to yield a bottoms product containing said residue, any nonylphenol and dinonylphenl in said bottoms product also being adducted with from 1.5 to 3 parts by weight of said oxyethylene per weight of the nonylphenol and dinonylphenol so that the average oxyethylene content of the entire bottoms product adduct is from 1.5 to 3 parts by weight.

13. The fluid of claim 12 wherein at least 1 pound per barrel of emulsifier is used.

14. A fluid useful in drilling and completing wells which comprises, in combination, a mixture in water of: clay; from 1 to 15 pounds per barrel of water-soluble alkaline earth metal salt capable of flocculating said clay; from 1 to 15 pounds per barrel of a phenol adducted with from 20 to 50 mols of ethylene oxide per mol of said phenol; the amounts of said salt and phenol adduct being selected from their respective ranges such that said clay is maintained in a flocculated state; from 1 to 20 volume percent of mineral oil dispersed in said water; and from 0.2 to 10 pounds per barrel of an emulsifier comprising a residue adducted with from 1.5 to 3 parts by weight of oxyethylene per weight of said residue, the residue comprising a mixture of components having a boiling point higher than that of dialkylphenol with the mixture being derived by alkylating phenol with an alkylene having from 4 to 20 carbon atoms, fractionating the alkylate to remove at least some of the alkylphenol and to yield a bottoms product containing said residue, any alkylphenol and dialkylphenol in said bottoms product also being adducted with from 1.5 to 3 parts by weight of said oxyethylene per weight of the alkylphenol and dialkylphenol so that the average oxyethylene content of the entire bottoms product adduct is from 1.5 to 3 parts by weight.

15. The fluid of claim 14 wherein at least 1 pound per barrel of said emulsifier is used.

16. A fluid useful in drilling and completing wells which comprises, in combination, a mixture in water of: a clay; a surfactant comprising an oxyethylene adduct of a compound selected from the group consisting of phenol and alkylphenol, any alkyl group of the latter having a total of from 1 to 10 carbon atoms and said oxyethylene being present in an amount such that said compound is a substantially water-soluble adduct; a water-soluble alkaline earth metal salt capable of flocculating said clay; said salt and surfactant being present in amounts sufficient to flocculate said clay; from 1 to 20 volume percent of mineral oil dispersed in said water; and from 0.2 to 10 pounds per barrel of an emulsifier comprising a residue adducted with from 1.5 to 3 parts by weight of oxyethylene per weight of said residue, the residue comprising a mixture of components having a boiling point higher than that of dinonylphenol with the mixture being derived by alkylating phenol with nonene, fractionating the alkylate to remove at least some of the nonylphenol and to yield a bottoms product containing said residue, any nonylphenol and dinonylphenol in said bottoms product also being adducted with from 1.5 to 3 parts by weight of said oxyethylene per weight of the nonylphenol and dinonylphenol so that the average oxyethylene content of the entire bottoms product adduct is from 1.5 to 3 parts by weight.

17. A fluid useful in drilling and completing wells which comprises, in combination, a mixture in water of: a clay; a surfactant comprising an oxyethylene adduct of a compound selected from the group consisting of phenol and alkylphenol, any alkyl group of the latter having a total of from 1 to 10 carbon atoms and said oxyethylene being present in an amount such that said compound is a substantially water-soluble adduct; a water-soluble alkaline earth metal salt capable of flocculating said clay; said salt and surfactant being present in an amount sufficient to flocculate said clay; from 1 to 20 percent of a mineral oil dispersed in said water; and an emulsifier comprising a residue adducted with from 1.5 to 3 parts by weight of oxyethylene per weight of said residue, the residue comprising a mixture of components having a boiling point higher than that of dialkylphenol with the mixture being derived by alkylating phenol with an alkylene having from 4 to 20 carbon atoms, fractionating the alkylate to remove at least some of the alkylphenol and to yield a bottoms product containing said residue, any alkylphenol and dialkylphenol in said bottoms product also being adducted with from 1.5 to 3 parts by weight of said oxyethylene per weight of the alkylphenol and dialkylphenol so that the average oxyethylene content of the entire bottoms product adduct is from 1.5 to 3 parts by weight, said emulsifier being present in an amount sufficient to stabilize the dispersion of said oil in said water and to substantially reduce the fluid loss from said fluid upon heating the same to an elevated temperature.

18. The method of reducing the fluid loss from a well fluid containing clay maintained in a flocculated state by a water-soluble alkaline earth metal salt and a water-soluble "clay flocculating surfactant" comprising an oxyethylene adduct of a phenol which comprises the steps of dispersing from 1 to 20 volume percent of a mineral oil in said fluid, adding sufficient of an emulsifier to stabilize the resulting dispersion and to substantially reduce the fluid loss from said fluid, said emulsifier comprising a residue adducted with from 1.5 to 3 parts by weight of oxyethylene per weight of said residue, the residue comprising a mixture of components having a boiling point higher than that of dinonylphenol with the mixture being derived by alkylating phenol with nonene, fractionating the alkylate to remove at least some of the nonylphenol and to yield a bottoms product containing said residue, any nonylphenol and dinonylphenol in said bottoms product also being adducted with from 1.5 to 3 parts by weight of said oxyethylene per weight of the nonylphenol and dinonylphenol so that the average oxyethylene content of the entire bottoms product adduct is from 1.5 to 3 parts by weight.

19. The method of reducing the fluid loss from a well fluid containing a clay maintained in a flocculated state by a water-soluble alkaline earth metal salt and a water-soluble "clay flocculating surfactant" comprising an oxyethylene adduct of a phenolic material which comprises dispersing from 1 to 20 volume percent of a mineral oil in said fluid, adding from 0.2 to 10 pounds per barrel of an emulsifier comprising a residue adducted with from 1.5 to 3 parts by weight of oxyethylene per weight of said residue, the residue comprising a mixture of components having a boiling point higher than that of dialkylphenol with the mixture being derived by alkylating phenol with an alkylene having from 4 to 20 carbon atoms, fractionating the alkylate to remove at least some of the alkylphenol and to yield a bottoms product containing said residue, any alkylphenol and dialkylphenol in said bottoms product also being adducted with from 1.5 to 3 parts by weight of said oxyethylene per weight of the alkylphenol and dialkylphenol so that the average oxyethylene content of the entire bottoms product adduct is from 1.5 to 3 parts by weight.

20. The method of claim 19 wherein said salt is calcium sulfate and said oxyethylene adduct is phenol adducted with about 30 mols of oxyethylene per mol of phenol.

21. The method of claim 19 wherein at least 1 pound per barrel of said emulsifier is used.

References Cited in the file of this patent

UNITED STATES PATENTS

| 2,423,144 | Gregg | July 1, 1947 |
| 2,509,588 | Dawson | May 30, 1950 |
| 2,589,949 | Meadors | Mar. 18, 1952 |
| 2,593,112 | Cross et al. | Apr. 15, 1952 |
| 2,873,251 | Jones | Feb. 10, 1959 |

OTHER REFERENCES

Burdyn et al.: "That New Drilling Fluid For Hot Holes," article in The Oil and Gas Journal, Sept. 10, 1956, pp. 104–107.